(12) United States Patent
Vidovic et al.

(10) Patent No.: US 6,934,015 B1
(45) Date of Patent: Aug. 23, 2005

(54) METHOD AND A DEVICE FOR BENDING COMPENSATION IN INTENSITY-BASED FIBRE-OPTICAL MEASURING SYSTEMS

(75) Inventors: Nevio Vidovic, Kållered (SE); Martin Krantz, Västra Frölunda (SE); Svante Höjer, Kungälv (SE)

(73) Assignee: Samba Sensors AB, Gothenburg (SE)

( * ) Notice: Subject to any disclaimer, the term of this patent is extended or adjusted under 35 U.S.C. 154(b) by 0 days.

(21) Appl. No.: 10/018,220

(22) PCT Filed: Jun. 16, 2000

(86) PCT No.: PCT/SE00/01296

§ 371 (c)(1),
(2), (4) Date: Apr. 26, 2002

(87) PCT Pub. No.: WO00/79233

PCT Pub. Date: Dec. 28, 2000

(30) Foreign Application Priority Data

Jun. 18, 1999 (SE) .................................. 9902320

(51) Int. Cl.$^7$ ........................................... G01N 21/00
(52) U.S. Cl. .................................................. 356/73.1
(58) Field of Search ..... 356/73.1; 250/227.14–227.23; 385/11–13, 115–119

(56) References Cited

U.S. PATENT DOCUMENTS

| 4,356,396 A | 10/1982 | Ruell et al. |
| 4,418,392 A | 11/1983 | Hata |
| 4,858,615 A | 8/1989 | Meinema |
| 4,924,870 A | 5/1990 | Wlodarczyk et al. |
| 5,089,979 A | 2/1992 | McEachern et al. |
| 5,249,143 A | 9/1993 | Staley, III |
| 5,280,173 A | 1/1994 | Morse et al. |
| 5,422,478 A | 6/1995 | Wlodarczyk et al. |
| 5,747,793 A * | 5/1998 | Sundburg et al. ...... 250/227.14 |
| 5,857,777 A | 1/1999 | Schuh |
| 6,210,346 B1 * | 4/2001 | Hall et al. ............... 600/561 |

FOREIGN PATENT DOCUMENTS

| EP | 0326309 A2 | 8/1989 |
| EP | 0528657 A2 | 2/1993 |

* cited by examiner

*Primary Examiner*—Tu T. Nguyen
(74) *Attorney, Agent, or Firm*—Burns, Doane, Swecker & Mathis, L.L.P.

(57) ABSTRACT

Compensation is provided for bending of an optical fibre in intensity-based optical measuring systems. A measuring signal and a reference signal of different wavelengths are generated and transmitted through an optical connection towards a sensor element. The reference signal is not influenced in the sensor element. The measuring and reference signals are detected and compensation is carried out for bending of the optical connection using correction data. The correction data is based upon pre-store data concerning the relationship between the measured reference signal and the measured measuring signal as a function of the bending influence on the optical connection. Devices and methods according to the invention allow for measurements with an optical pressure measuring system that exhibit effective compensation for any bending of the optical connection.

16 Claims, 3 Drawing Sheets

METHOD AND A DEVICE FOR BENDING COMPENSATION IN INTENSITY-BASED FIBRE-OPTICAL MEASURING SYSTEMS

TECHNICAL FIELD

The present invention relates to a method for measuring systems intended for use with intensity-based fibre-optical measuring systems for pressure measurements. The invention also relates to a device for carrying out such a method.

BACKGROUND ART

In connection with measuring physical parameters such as pressure and temperature, it is previously known to utilise various sensor systems by which the optical intensity of a ray of light, conveyed through an optical fibre and coming in towards a sensor element, is influenced due to changes in the respective physical parameter. Such a system may for example be used when measuring the blood pressure in the veins of the human body. Said system is based upon a transformation from pressure to a mechanical movement, which in turn is transformed into an optical intensity, conveyed by an optical fibre, which is in turn transformed into an electrical signal that is related to the measured pressure.

According to known art, such a fibre-optical measurement system may comprise a pressure sensor, an optical fibre connected to said pressure sensor, and at least one light source and at least one light detector located at the opposite end of the fibre, in order to provide the pressure sensor with light, and to detect the information-carrying light signal returning from the pressure sensor, respectively.

One problem occurring with previously known systems of the above kind relates to the fact that interference may occur in the signal transmission path, for example caused by fibre couplings or through bending, intentionally or unintentionally, of the fibre. Already at a light deflection of the fibre, a reduction of the light signal occurs. This signal damping, caused by the bent fibre, entails that the light signal detected in the light detector, which is related to the pressure detected in the sensor element, will have a value that does not coincide with the real pressure. The size of the deviation will then depend on how much the fibre was deflected.

Through EP 0 528 657 A2 a fibre-optical measurement system for measuring pressure is known. Said system comprises a pressure sensor with a membrane, three LED:s emitting light at different wavelengths, and two photo detectors. The system is arranged so that a computing algorithm is used for correction of such temperature effects that may have been superimposed on the output pressure signal. This algorithm is based upon the relationship between membrane deflection, pressure and temperature. Correction data obtained experimentally may also be used as input data to the algorithm regarding temperature compensation.

DISCLOSURE OF INVENTION

A primary object of the present invention is to compensate, by means of a method and a device, for interference in intensity-based fibre-optical sensor systems, caused by intentional or unintentional bending of the optical fibre. This is achieved by means of a method and a device in accordance with the present invention.

The invention is intended for bending compensation in intensity-based optical measurement systems comprising a sensor element connected to a measuring and control unit via an optical connection and adapted for providing a signal corresponding to a measurement of a physical parameter in connection with the sensor element. The invention comprises; the generation of a measuring signal that is brought to come in towards the sensor element; the generation of a reference signal that is transmitted through the optical connection without being influenced in the sensor element, said measuring signal and said reference signal having different wavelengths; and the detection of said measuring signal and the detection of said reference signal. The invention is characterised by comprising bending compensation through correction data based upon pre-stored data concerning the relationship between the measured reference signal and the measured measuring signal as a function of the bending influence on said optical connection.

Advantageous embodiments of the invention are defined by the subsequent dependent claims.

BRIEF DESCRIPTION OF DRAWINGS

The invention will be explained in more detail below, with reference to a preferred embodiment and to the enclosed drawings, in which.

PREFERRED EMBODIMENTS

Figure 1:
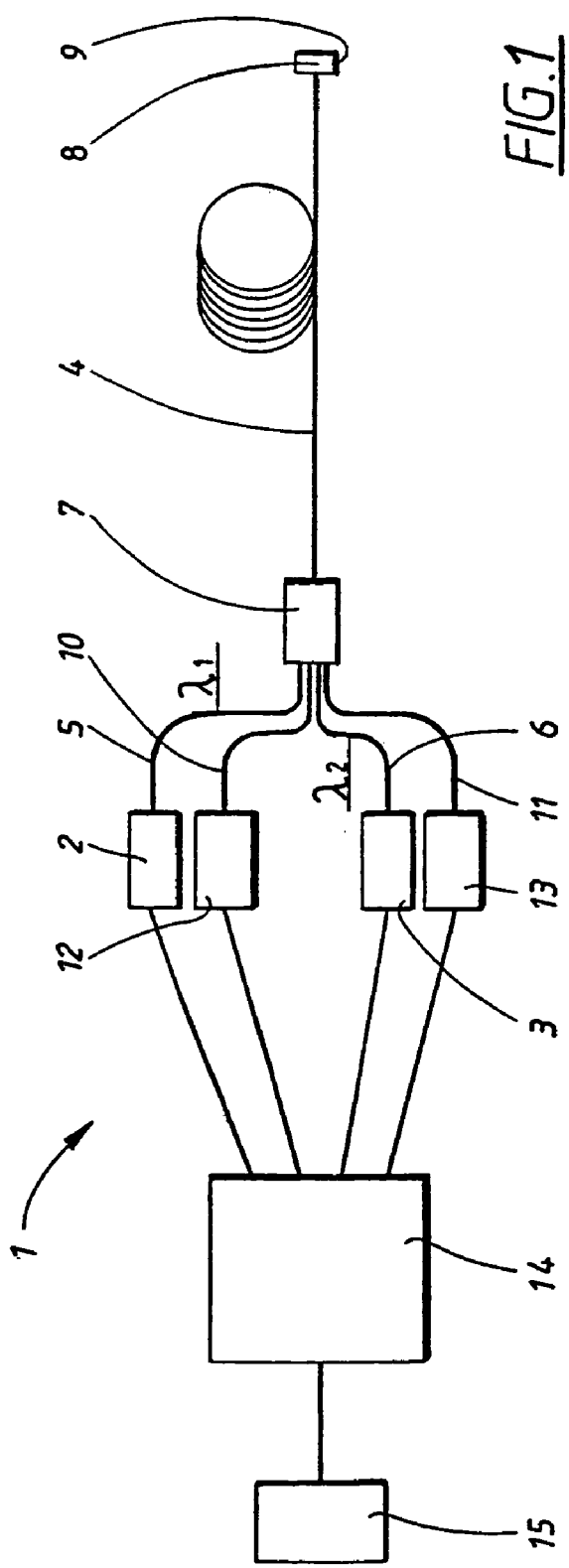
FIG. 1 shows, schematically, a pressure measuring system according to the present invention.

FIG. 1 shows, schematically, an intensity-based fibre-optical measuring system 1 according to the present invention. According to a preferred embodiment, the arrangement is used in connection with a fibre-optical measuring system of an as such previously known kind, which could preferably, but not exclusively, consist of a pressure measuring system. Alternatively, the invention could be used e.g. for measuring temperature and acceleration.

Two light sources belong to the system 1, comprising a first LED 2 and a second LED 3, the first LED 2 functioning to emit a first light signal of a first wavelength $\lambda_2$, and the second LED 3 functioning to emit a second light signal of a second wavelength $\lambda_2$, said wavelengths being different. The LED:s 2, 3 are connected to an optical conduit, preferably in the form of an as such previously known optical fibre 4, by means of a first link 5 and a second link 6, respectively, and also via a fibre coupling 7. The optical fibre 4 is connected to a sensor element 8, schematically illustrated in FIG. 1.

Figure 1A:
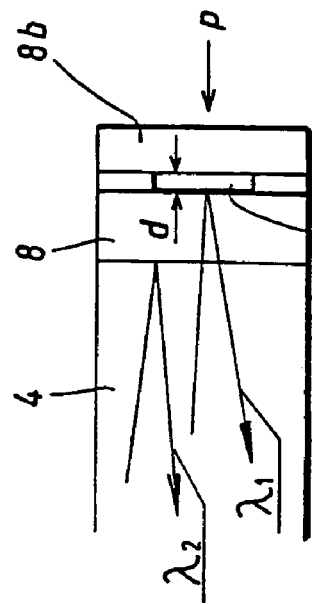
FIG. 1a shows an enlarged view of a sensor element intended for use in connection with the invention.

According to what is shown in detail by FIG. 1a, which is an enlarged view of the sensor element 8, said element comprises a cavity 8a, for example obtainable (according to known art) through construction by means of molecular layers (primarily silicone, alternatively silicone dioxide or a combination of the two) and an etching procedure. Preferably, a bonding procedure is also utilised in assembling the various layers of the sensor element 8. The manufacture of such a sensor element 8 is as such previously known, e.g. from the patent Document PCT/SE93100393. In this way, a membrane 8b is also created within the sensor element 8, the deflection of which membrane will depend on the pressure p surrounding the sensor element 8.

According to what will be described in detail below, the first light signal with the first wavelength $\lambda_1$ will come in and be reflected against the cavity 8a within the pressure sensor 8, whereas the second light signal with the second wavelength $\lambda_2$ is brought to come in onto the bottom side of the sensor element 8, i.e. towards the interface between the pressure sensor 8 and the optical fibre 4. Hereby, the first light signal will be modulated by the pressure p acting on the membrane 8b. When the membrane 8b is influenced, the dimensions of the cavity 8a, primarily its depth d, will change, entailing a modulation of the first light signal through optical interference inside the cavity 8a.

The second light signal will be reflected against the bottom side of the sensor element 8, due to the fact that the silicone defining the sensor element 8 will only allow transmission of light with a wavelength longer than a certain limit value (e.g. 900 nm). Consequently, said first wavelength $\lambda_1$ will be selected so as to exceed this limit value. Contrary to this, said second wavelength $\lambda$ will be selected so as to fall below this limit value. After having determined the two wavelengths $\lambda_1$, $\lambda_2$, appropriate dimensions of the cavity 8a are determined. For example, the depth of the cavity 8a is selected to be a value of substantially the same magnitude as the two wavelengths $\lambda_1$, $\lambda_2$. The sizing of the cavity 8a is made considering the required application range for the sensor element 8 (in the current case primarily the pressure range to which the sensor element 8 is to be adapted).

The light signal ($\lambda_1$) emitted from the first LED 2 defines a measuring signal that is thus transmitted through the fibre 4 to the sensor element 8, where said light signal will be modulated in the manner described above. The second light signal ($\lambda_2$) will then define a reference signal, transmitted through the fibre 4 and being reflected by the bottom side 9 of the sensor element 8. The light signal modulated in the sensor element 8 and the light signal reflected from the bottom side 9 of the sensor element are then transmitted back through the fibre 4. The returning light signals will, through the fibre coupling 7, be conveyed into fibre links 10, 11, connected to the detectors 12 and 13, respectively. The detectors 12, 13 will detect the measuring signal and the reference signal, respectively.

The four links 5, 6, 10, 11 preferably consist of optical fibres, the fibre coupling 7 thereby preferably consisting of an as such known fibre junction device designed so as to transfer the four fibre links 5, 6, 10, 11 into the fibre 4 leading to the sensor element 8.

The system 1 also comprises a computerised measuring and control unit 14, to which the LED:s 2, 3 and the detectors 12, 13 are connected. Said unit 14 comprises means for processing the values detected by said detectors 12, 13. According to the invention, the processing of the detected values includes a compensation for intentional or unintentional bending of the fibre 4, by utilising correction data based upon pre-stored data concerning the relationship between a measured reference signal and a measured measuring signal as a function of the bending influence on the optical fibre 4. Such correction data could for example be comprised of a table or a function defining values to be used during measurements to correct the detected measuring signal.

Finally, the system 1 comprises a presentation unit 15, e.g. a display, allowing a measurement of the sensed pressure p to be visualised for a user.

Figure 2:
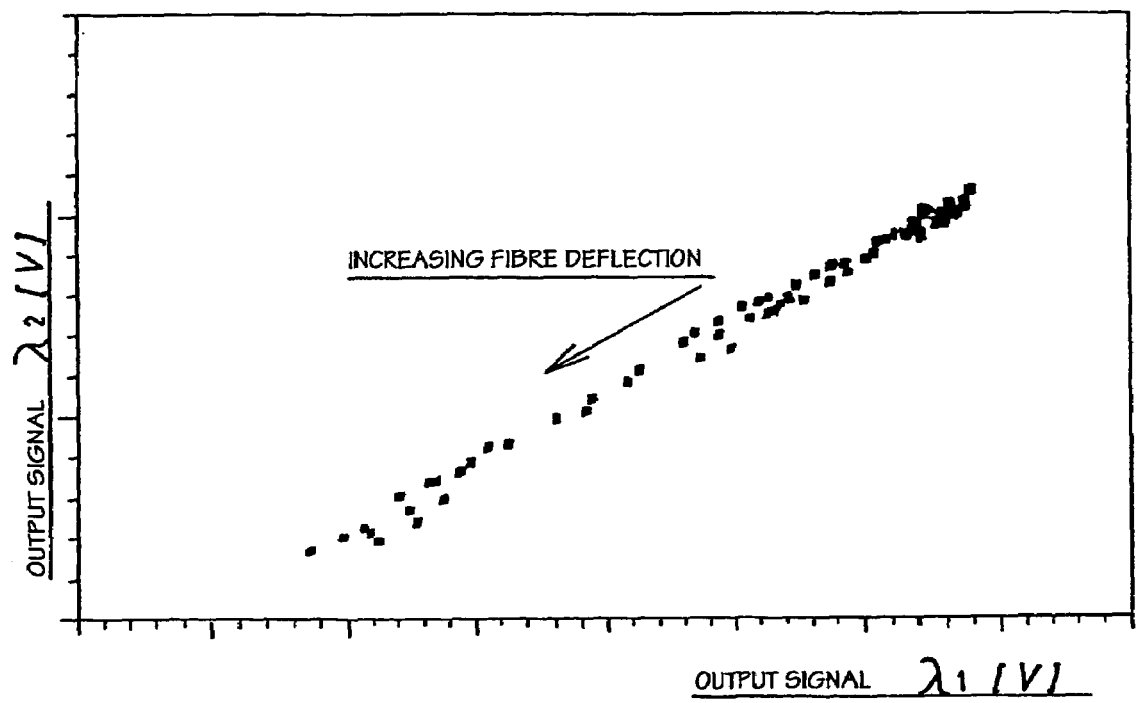
FIG. 2 shows a graph illustrating the relationship between a measured reference signal and a measured measuring signal as a function of the bending influence, in accordance with a method according to the invention.

FIG. 2 graphically illustrates how the above relationship between a measured reference signal and a measured measuring signal is changed during increased bending of the fibre 4. In the figure, the reference signal is referenced as "Output signal $\lambda_2$ [V]" and the measuring signal as "Output signal $\lambda_1$ [V]". Said measured relationship can be described by a function, so as to correct the measuring signal continuously with a specific value depending on the reference signal. Alternatively, the measured relationship can be used for defining a mathematical function, which in turn is used for producing corrected values during measurements with the system according to the invention. As a further alternative, a number of measurement values may be registered in a table, into which the value of the reference signal is entered, to obtain a value (with the aid of interpolation, if necessary), with which the current measuring signal is corrected. Independently of the correction procedure used, it is performed in the above-mentioned measuring and control unit 14.

Figure 3:
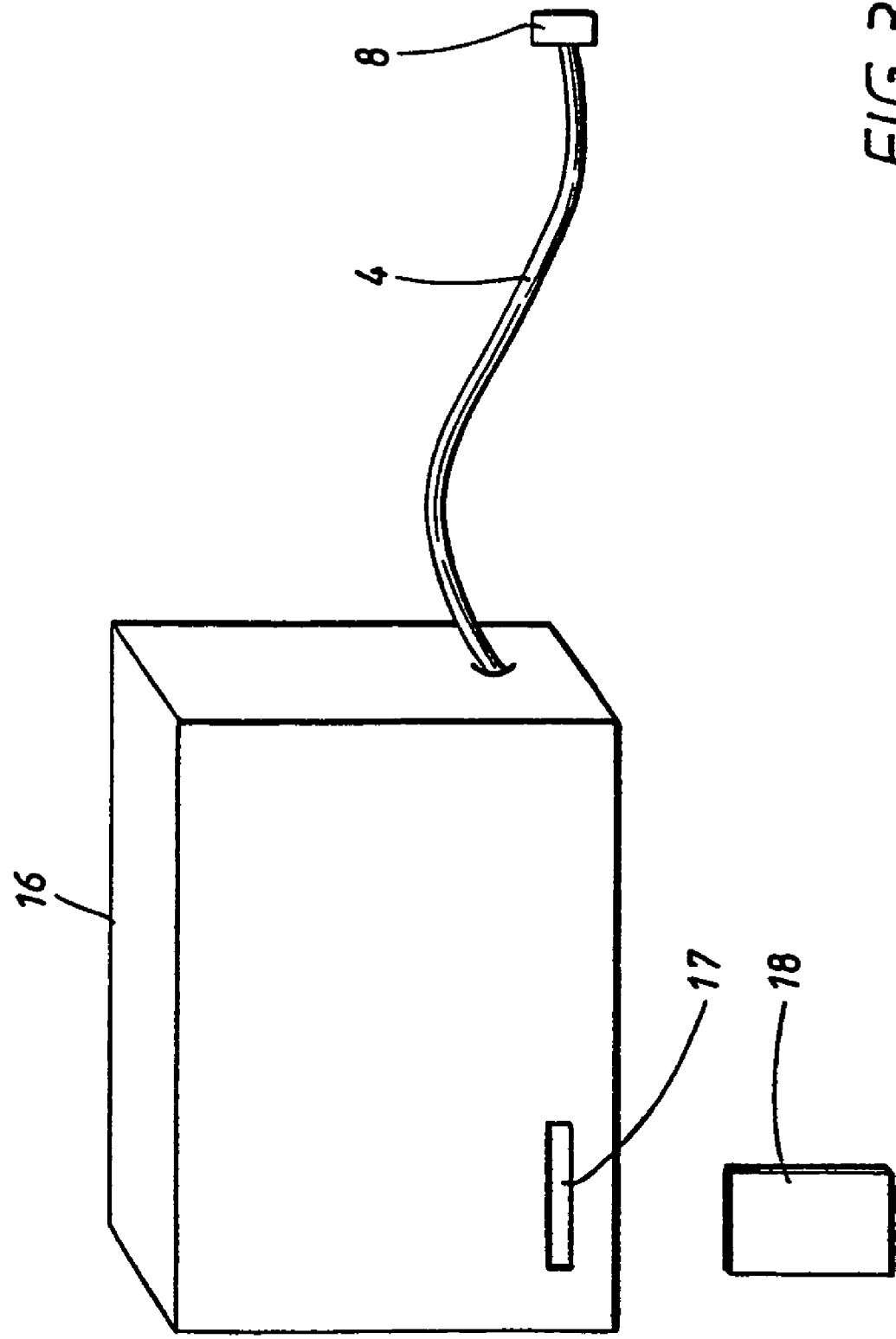
FIG. 3 shows, in principle, a pressure measuring system in which a so-called "smart card" can be used as the information-carrying memory unit.

FIG. 3 shows, in principle, a pressure measuring system according to the invention, comprising an alternative measuring unit 16 to which the sensor element 8 is connected, via the optical fibre 4, in an exchangeable manner via an optical coupling (not shown in FIG. 3). Said measuring unit 16 also comprises a reader unit 17 for insertion and reading of a separate unit in the form of an information-carrying card 18 (also called "smart card"). Said card 18 comprises a memory device where data regarding the sensor element 8 are stored for use. During measurements, these data may be read by the measuring unit 16 and be used for example for bending compensation in dependence of which specific sensor element 8 that is being used for the moment. The invention thus provides a further advantage, in that different sensor elements 8 can be connected to said unit 16 without calibration, thanks to data stored on the information-carrying card 17. Said data preferably define the relationship between predetermined correction data, produced through measurements of the first as well as the second light signal at various degrees of bending of the optical fibre.

The invention is especially suitable in case a single measurement station with one measuring unit 16 is used together with several exchangeable sensor elements. In such a case, data corresponding to properties, measuring range, etc. of each sensor element, can be stored on a corresponding number of information-carrying cards, each then corresponding to (and being used together with) a specific sensor element.

As an alternative to an information-carrying unit in the form of a card, the invention can also be used with other types of separate data carriers. Further, the measuring system according to FIG. 3, as opposed to what is shown in FIGS. 1 and 2, is not limited to measurements of the kind using two different wavelengths, but can also be used when measuring with for example only one wavelength.

It should be mentioned, that the card 18 may also contain other stored information than that mentioned above, e.g. information regarding the sensor type, calibration data, etc. The basic principle is, however, that the card 18 is coordinated with a specific sensor element such that it will comprise stored data regarding the function of the specific sensor element. Preferably, the card 18 will be provided with information—in the form of a set of parameters—allowing the properties of the sensor element 8, together with the properties of the measuring unit 16, to provide a suitable linearisation of the characteristics of the specific sensor element during measurements.

The invention is not limited to the embodiment described above, but may be varied within the scope of the appended claims. For example, the principle for data storage regarding a specific sensor on a separate information-carrying card can be used also for systems not intended for pressure measurements.

What is claimed is:

1. A method of compensating for bending of an optical fibre in light intensity-based optical measuring systems, said light intensity-based optical measuring systems comprising a sensor element connected to a measuring and control unit via optical fibre and being adapted for providing a signal corresponding to a measurement of a physical parameter, said method comprising generating a measuring light signal;

transmitting the measuring light signal through the optical fibre towards the sensor element;

generating a reference light signal;

transmitting the reference light signal through the same optical fibre without being affected by the sensor element due to the measuring light being separated from the reference light, wherein said measuring light signal and said reference light signal have different wavelengths;

detecting said measuring light signal after being influenced by the sensor element;

detecting said reference light signal after being transmitted through the optical fibre and after being reflected by said sensor element;

compensating for bending of the optical fibre by reference to correction data based upon pre-stored data concerning a relationship between the measured reference light signal and the measured measuring light signal as a function of the bending influence upon said optical fibre, wherein said measuring light signal causes optical interference in a cavity associated with the sensor element.

2. The method according to claim 1, wherein said correction data includes a stored table or function, describing a relationship measured beforehand, between the reference light signal and the measuring light signal, as a function of the bending influence.

3. A method according to claim 1, wherein said sensor is utilized for pressure measurements, said sensor element including a membrane being affected by the pressure surrounding the sensor element.

4. The method according to claim 1, further comprising guiding the measuring light signal into the cavity of the sensor element; and reflecting the reference light signal from the sensor element without entry into the cavity.

5. The method according to claim 1, wherein characteristics of material forming at least one surface of said cavity permits guiding the measuring light signal into the cavity and causes reflectance of the reference light signal from the cavity.

6. The method of claim 1, wherein the wavelength of the measuring light signal is selected to exceed a limit value and the wavelength of the reference light signal is selected to be less than said limit value.

7. The method of claim 6, wherein said limit value is based on a characteristic of the senor element material.

8. The method of claim 6, wherein dimensions of the cavity are determined based on a selected wavelength of the measuring light signal, a selected wavelength of the reference light signal and the limit value.

9. A device for measurements in optical measuring systems comprising:

a sensor element adapted for providing a signal corresponding to a measurement of a physical parameter in connection with the sensor element;

an optical fibre connected to the sensor element;

a first light source and a second light source arranged at the opposite end of the optical fibre and functioning to emit a first light signal and a second light signal, respectively, at different wavelengths, the first light signal defining a measuring signal, transmitted towards the sensor element through the optical fibre, and the second light signal defining a reference signal, transmitted through the optical fibre without being affected by the sensor element due to the measuring light being separated from the reference light;

a first detector intended to detect a light signal modulated by the sensor element;

a second detector intended to detect a light signal reflected by the sensor element; and a measuring and control unit, to which said detectors are connected, whereby said measuring and control unit comprising means for processing the values detected by said detectors, means for storing data concerning the relationship between the measured reference signal and the measured measuring signal as a function of the bending influence upon said optical connection, and means for correcting the value detected by the first detector in dependence of said correction data, wherein said sensor element comprising a cavity, shaped so as to create optical interference when feeding said measuring signal into the cavity.

10. The device according to claim 9, wherein said cavity includes a plurality of molecular silicone and/or silicone dioxide layers which have been etched.

11. The device according to claim 10, whereby said cavity includes bonding layers.

12. The device of claim 9, wherein the measurement light signal is guided into the cavity, whereas the reference light signal is reflected by the sensor element without entering the cavity.

13. The device of claim 9, wherein characteristics of material forming at least one surface of said cavity permits guiding of the measuring signal into the cavity and causes reflectance of the reference signal from the cavity.

14. The device of claim 9, wherein the wavelength of the first light signal exceeds a limit value and the wavelength of the second light signal is less than the limit value.

15. The device of claim 14, wherein said limit value is based on a characteristic of the sensor element material.

16. The device of claim 14, wherein dimensions of the cavity are determined based on the first wavelength, the second wavelength and the limit value.

* * * * *